Patented Aug. 4, 1942

2,291,643

UNITED STATES PATENT OFFICE 2,291,643

UNSATURATED HYDROXY-PREGNENE DERIVATIVES

Russell Earl Marker, State College, Pa., assignor to Parke, Davis & Company, Detroit, Mich., a corporation of Michigan No Drawing. Application May 15, 1941, Serial No. 393,668

5 Claims. (Cl. 260—397.4)

This application is a continuation-in-part of my application, Serial No. 317,419, filed February 5, 1940.

In my copending applications Serial No. 393,667, filed May 15, 1941, and Serial No. 382,450, filed March 8, 1941, I have set forth the preparation of new sapogenin derivatives which I designate as pseudo-sapogenins and exo-dihydro-pseudo-sapogenins, respectively. In these applications I have also set forth the manner in which these new classes of compounds may be oxidized to form $\Delta^{16}$-20-keto-pregnene compounds, i. e., steroids having in ring D the structure

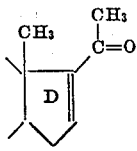

The present application describes a particularly valuable group of $\Delta^{16}$-20-keto-pregnene compounds which are easily prepared from the readily available sarsasapogenin and which are especially easily converted into valuable steroidal hormones. The new compounds of the present invention may be represented by the formula

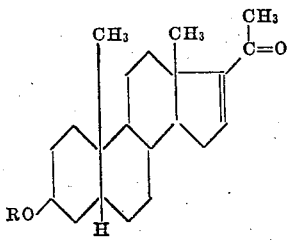

where R is a member of the class consisting of hydrogen and acyl radicals and said radical RO— having one of the two epimeric configurations, $\alpha$ and $\beta$.

These compounds are prepared by mildly oxidizing a pseudo-sarsasapogenin derivative having the appropriate configuration at $C_3$ and protected at the $C_3$ hydroxyl group by an acyl group. The resulting $\Delta^{16}$-pregnenol-3-one-20 acylate is then hydrolyzed if the free hydroxy-ketone is desired. For example, the oxidation, under mild conditions, of pseudo-sarsasapogenin diacetate, exo-dihydro-pseudo-sarsasapogenin diacetate, or the dibutyrate or other diacylate of either pseudo-sarsasapogenin or exo-dihydro-pseudo-sarsasa-pogenin yields the new $\Delta^{16}$-pregnenol-3-($\beta$)-one-20 acylates of the formula

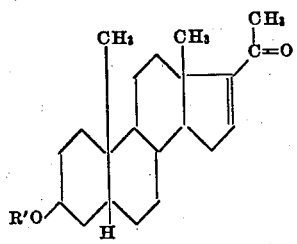

where R' is an acyl radical. Likewise, oxidation of pseudo-epi-sarsasapogenin diacetate, exo-dihydro-pseudo-epi-sarsasapogenin diacetate, or other ester of either pseudo-epi-sarsasapogenin or exo-dihydro-pseudo-sarsasapogenin yields the new $\Delta^{16}$-pregnenol-3-($\alpha$)-one-20 acylates of the formula

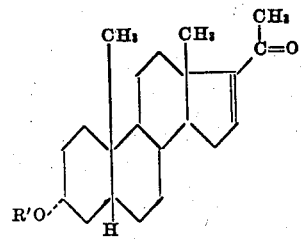

where R' is an acyl radical.

The esters of $\Delta^{16}$-pregnenol-3-($\beta$)-one-20 or of $\Delta^{16}$-pregnenol-3-($\alpha$)-one-20 may be hydrolyzed by treatment with alkaline or acidic reagents with formation of the parent hydroxy ketone, namely, $\Delta^{16}$-pregnenol-3-($\beta$)-one-20 or $\Delta^{16}$-pregnenol-3-($\alpha$)-one-20, respectively. These compounds are representable by the formulae,

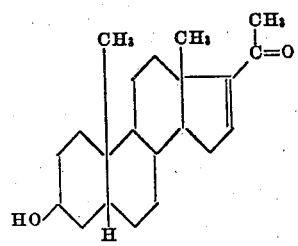

$\Delta^{16}$—Pregnenol—3—($\beta$)—one—20

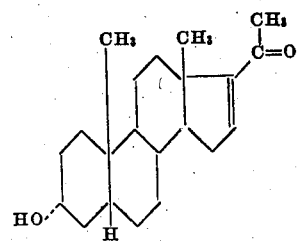

$\Delta^{16}$—Pregnenol—3—($\alpha$)—one—20

When $\Delta^{16}$-pregnenol-3-($\beta$)-one-20 is crystallized from solutions containing alcohol the product is found to contain alcohol of crystallization and this product has M. P. 208–210° C. On subliming this in a high vacuum and crystallizing the sublimate from ether-pentane, the alcohol-free $\Delta^{16}$-pregnenol-3-($\beta$)-one-20 is obtained, M. P. 188–190° C.

My invention may be further illustrated by the following examples.

Example 1

A mixture of 9.16 g. of epi-sarsasapogenin acetate and 16 cc. of acetic anhydride is heated in a bomb tube at 200° C. for ten hours. Then the excess acetic anhydride is evaporated in vacuo and the residual pseudo-epi-sarsasapogenin diacetate is dissolved in 200 cc. of glacial acetic acid and cooled to 15° C. The mixture is vigorously stirred while a solution of 6 g. of chromic anhydride in 50 cc. of 85% acetic acid is added at such a rate that the temperature does not rise above 25° C. After the mixture has stood an additional ninety minutes at about 28° C., water is added and the mixture extracted with ether. The ethereal solution is washed well with water and with a 3% solution of sodium hydroxide. Then the ethereal extract is evaporated to dryness and the residue refluxed with a solution of 3 g. of potassium hydroxide in 200 cc. of alcohol for thirty minutes. The mixture is diluted with water, extracted with ether and the ethereal extract washed well with water. Then the ether is removed on a steam bath and the residue sublimed in a high vacuum at 120–130° C. The sublimate is crystallized from ether to give $\Delta^{16}$-pregnenol-3-($\alpha$)-one-20 of M. P. 194–196° C.

When $\Delta^{16}$-pregnenol-3-($\alpha$)-one-20 is refluxed with acetic anhydride and then the excess acetic anhydride removed by distillation, there remains a residue of $\Delta^{16}$-pregnenol-3-($\alpha$)-one-20 acetate which may be purified by crystallization from dilute methanol and dilute acetone, thus giving white needles of pure $\Delta^{16}$-pregnenol-3-($\alpha$)-one-20 acetate, M. P. 96–99° C.

Again, $\Delta^{16}$-pregnenol-3-($\alpha$)-one-20 may be dissolved in pyridine, treated with an equivalent of benzoyl chloride and after an hour the mixture diluted with water. The precipitated product may be collected and crystallized from acetone to give $\Delta^{16}$-pregnenol-3-($\alpha$)-one-20 benzoate in the form of white crystals.

Other esters such as the butyrate, the palmitate, the p-nitrobenzoate and the like may be prepared by analogous procedures.

Example 2

A mixture of 9.16 g. of sarsasapogenin acetate and 16 cc. of acetic anhydride is heated in a bomb tube at 200° C. for ten hours. The excess acetic anhydride is removed by distillation in vacuo and the residual pseudo-sarsasapogenin diacetate oxidized as follows. This crude product is dissolved in 200 cc. of glacial acetic acid, cooled to 15° C., and vigorously stirred while a solution of 6 grams of chromic anhydride in 50 cc. of 85% acetic acid is added at such a rate that the temperature does not rise above 25° C. Then the mixture is allowed to stand at 28° C. for ninety minutes after which water is added and the mixture extracted with ether. The ethereal solution is washed well with water, with 3% sodium hydroxide solution, and then the ether is removed on a steam bath. The residue comprising $\Delta^{16}$-pregnenol-3-($\beta$)-one-20 acetate is refluxed with a solution of 3 g. of potassium hydroxide in 20 cc. of alcohol for thirty minutes. Then the mixture is diluted with water, extracted with ether and the ethereal layer washed well with water. After removing the ether on a steam bath there is obtained a residue of $\Delta^{16}$-pregnenol-3-($\beta$)-one-20. On crystallization from aqueous alcohol this is obtained in the form of white needles, M. P. 207–209° C. containing alcohol of crystallization. By subliming this product in a high vacuum and recrystallizing it from ether-pentane there is obtained the alcohol-free $\Delta^{16}$-pregnenol-3-($\beta$)-one-20 of M. P. 188–190° C.

$\Delta^{16}$-pregnenol-3-($\beta$)-one-20 may be refluxed with acetic anhydride and the excess acetic anhydride removed to yield $\Delta^{16}$-pregnenol-3-($\beta$)-one-20 acetate which after crystallization from aqueous methanol has M. P. 144–146° C.

Other esters of $\Delta^{16}$-pregnenol-3-($\beta$)-one-20 such as the benzoate, the butyrate, the 3,5-dinitrobenzoate and the like may be prepared in analogous fashion by treating $\Delta^{16}$-pregnenol-3-($\beta$)-one-20 with appropriate acylating agents, for example, benzoyl chloride, butyryl chloride, or 3,5-dinitrobenzoyl chloride, respectively.

What I claim as my invention is:

1. A compound representable by the formula

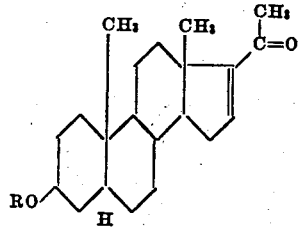

where R is a member of the class consisting of hydrogen and acyl radicals and having radical RO— having one of the two epimeric configurations, $\alpha$ and $\beta$.

2. $\Delta^{16}$-Pregnenol-3-($\beta$)-one-20.

3. $\Delta^{16}$-Pregnenol-3-($\alpha$)-one-20.

4. The acetate of $\Delta^{16}$-pregnenol-3-($\beta$)-one-20.

5. A lower fatty acid ester of $\Delta^{16}$-pregnenol-3-($\beta$)-one-20.

RUSSELL EARL MARKER.

Certificate of Correction

Patent No. 2,291,643. August 4, 1942.
RUSSELL EARL MARKER

It is hereby certified that errors appear in the printed specification of the above numbered patent requiring correction as follows: Page 2, second column, lines 45 to 50, claim 1, in the formula, for

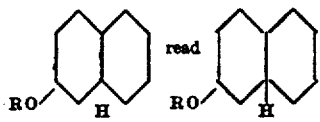

line 52, same claim, for "having" before "radical" read *said*; and that the said Letters Patent should be read with these corrections therein that the same may conform to the record of the case in the Patent Office.

Signed and sealed this 17th day of November, A. D. 1942.

[SEAL]

HENRY VAN ARSDALE,
*Acting Commissioner of Patents.*